(12) United States Patent
Leow et al.

(10) Patent No.: US 10,831,968 B1
(45) Date of Patent: Nov. 10, 2020

(54) RECONFIGURABLE CONNECTIONS

(71) Applicant: Synopsys, Inc., Mountain View, CA (US)

(72) Inventors: Yoon Kah Leow, Santa Clara, CA (US); Ting-Mao Chang, Davis, CA (US)

(73) Assignee: SYNOPSYS, INC., Mountain View, CA (US)

( * ) Notice: Subject to any disclaimer, the term of this patent is extended or adjusted under 35 U.S.C. 154(b) by 0 days.

(21) Appl. No.: 15/715,809

(22) Filed: Sep. 26, 2017

Related U.S. Application Data (60) Provisional application No. 62/400,069, filed on Sep. 26, 2016.

(51) Int. Cl.
| G06F 17/50 | (2006.01) |
| G06F 30/394 | (2020.01) |
| G06F 30/34 | (2020.01) |
| G06F 30/337 | (2020.01) |

(52) U.S. Cl.
CPC ............ G06F 30/394 (2020.01); G06F 30/34 (2020.01); *G06F 30/337* (2020.01)

(58) Field of Classification Search
CPC ............ G06F 17/5054; G06F 17/5077; G06F 15/7867; G06F 17/5031; G06F 15/17343; G06F 30/394; G06F 30/34; G06F 30/337
USPC .................. 716/116–117, 122, 126
See application file for complete search history.

(56) References Cited

U.S. PATENT DOCUMENTS

| 5,764,954 A | * | 6/1998 | Fuller | G06F 30/34 716/121 |
| 6,477,688 B1 | | 11/2002 | Wallace | |
| 7,039,811 B2 | * | 5/2006 | Ito | G06F 21/62 711/163 |
| 7,107,563 B1 | * | 9/2006 | Kong | G06F 17/5077 716/128 |
| 7,299,444 B1 | * | 11/2007 | Tai | G06F 17/5054 716/117 |
| 7,752,588 B2 | | 7/2010 | Bose | |
| 8,069,431 B1 | * | 11/2011 | Zhang | G06F 17/5077 716/128 |
| 8,484,600 B2 | * | 7/2013 | Nishio | G06F 17/5077 716/126 |
| 2015/0178437 A1 | * | 6/2015 | Zhang | G06F 17/5081 716/113 |

(Continued)

OTHER PUBLICATIONS

Chandrasekhar et al., "Effective Coupling between Logic Synthesis and Layout Tools for Synthesis of Area and Speed-Efficient Circuits," VLSI Design, 5(2):125-140, (1997).

*Primary Examiner* — Nghia M Doan
(74) *Attorney, Agent, or Firm* — Alston & Bird LLP

(57) ABSTRACT

An improved placement and routing method for circuit simulation includes receiving setup input controls to set up an initial arrangement of two blocks (e.g., a synthesized block and an IP block), and a designation of permutable interconnections; performing permutations of permutable interconnect signals on the, e.g., design block (or any other block)-IP block arrangement to determine an optimal permutation; compiling a bitstream comprising a final placement and route of a circuit based on the optimal permutation and generating the bitstream to be loaded onto a target FPGA; and sending the final order of the permutable signals to a permutable signals control memory structure.

9 Claims, 6 Drawing Sheets

(56) References Cited

U.S. PATENT DOCUMENTS

2017/0132351 A1\* 5/2017 Buehler ................ G06F 30/394

\* cited by examiner

RECONFIGURABLE CONNECTIONS

CROSS-REFERENCES TO RELATED APPLICATIONS

This application claims priority, under 35 U.S.C. § 119(e), from U.S. Provisional Application No. 62/400,069, filed on Sep. 26, 2016, entitled "RECONFIGURABLE CONNECTIONS", the contents of all of which is incorporated herein by reference in its entirety

FIELD OF THE INVENTION

The present invention generally relates to placement and routing of resources in programmable integrated circuits for use in an emulation system.

BACKGROUND

The disclosure relates to the field of functional verification and prototyping of integrated circuits and in particular to the generation of circuit descriptions of field-programmable gate arrays (FPGAs).

Figure 1:
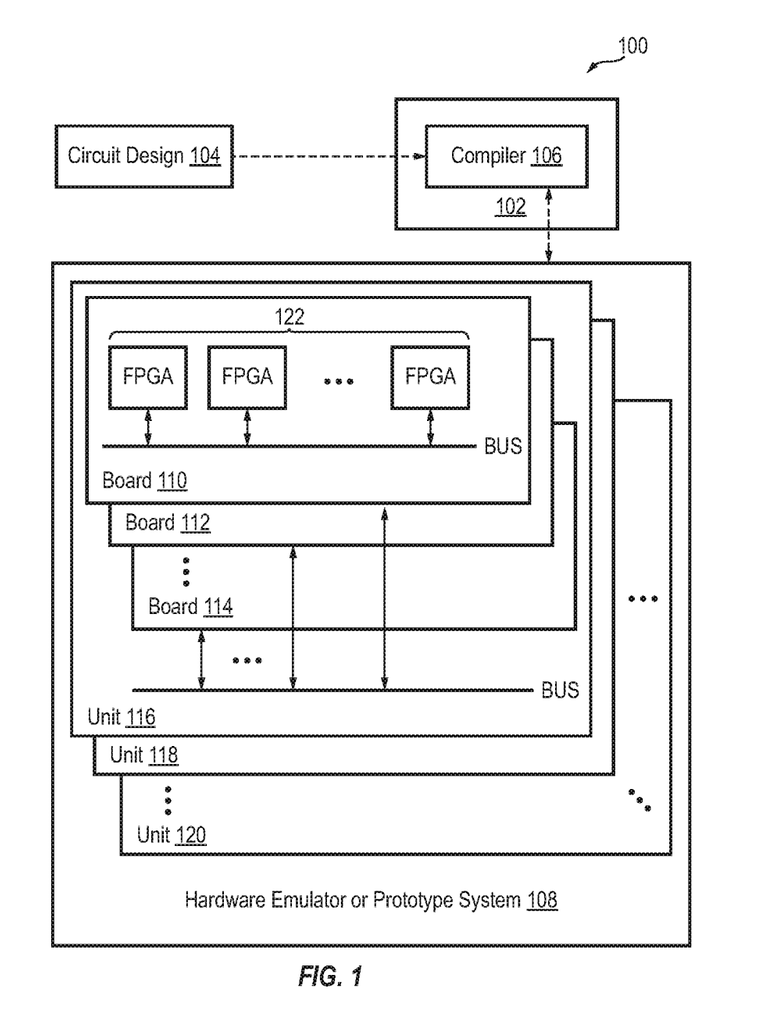
FIG. 1 is an exemplary high-level block diagram of a hardware verification system 100, in accordance with one embodiment of the present invention.

The functional verification and prototyping of complex integrated circuits (also known as application specific integrated circuits (ASIC)) is usually done with emulation systems, such as hardware verification system 100. These emulation systems, including hardware verification system 100, are constituted of a hardware part, the hardware emulator or prototype system 108, which will behave like the circuit design 104 under verification, and a software compiler 106 that is used to map a description of the circuit design 104 onto the physical resources available in the hardware emulator or prototype system 108. The compiler 106 may be executed on a computer system 102.

Some emulators, including hardware emulator or prototype system 108, are made of numerous programmable components 122, such as field-programmable gate arrays, FPGAs (typically from 9 to 800 FPGAs in the Synopsys ZeBu-Server family of emulators) interconnected through printed circuit boards (e.g., board 110, board 112, . . . board 114) and/or cables. These FPGAs can be general purpose FPGAs such as Xilinx virtex7 FPGAs, or custom FPGAs specially designed by the emulator vendor. The main tasks of the compiler system 106 are the partitioning of the circuit design 104 into multiple sub-circuits (e.g., unit 116, unit 118, . . . unit 120, board 110, board 112 . . . board 114), which will be mapped each on one specific FPGA (within a given board and unit), and the routing of the signals in the circuit design 104 which join different sub-circuits mapped on different FPGAs on the physical inter FPGA connections. FPGAs often include several function blocks that are based on programmable logic array (PLA) architecture with sum-of-products logic. A configurable interconnect matrix transmits signals between the function blocks.

An example FPGA includes an array of configurable logic blocks (CLBs) and a ring or columns of programmable input/output blocks (IOBs). The CLBs and IOBs are interconnected by a programmable interconnect structure (routing resources). The CLBs, IOBs, and interconnect structure are typically programmed by loading a stream of configuration data (bitstream) into internal configuration memory cells that define how the CLBs, IOBs, and interconnect structure are configured. The configuration bitstream may be read from an external memory, conventionally an external integrated circuit memory EEPROM, EPROM, PROM, and the like, though other types of storage media may be used. The collective states of the individual memory cells determine the function of the FPGA. A specific type of FPGA uses a look-up-table based CLB. The configuration memory provides input values to a number of multiplexers controlled by input to the CLB.

A conventional design process for an integrated circuit, such as an ASIC or an FPGA begins with the creation of the circuit design 104. The circuit design 104 specifies the function of a circuit at a schematic, logic or functional level and may be represented using various programming languages (e.g., VHDL, ABEL or Verilog) or schematic capture programs. The circuit design 104 may be synthesized to produce a logical network list ("netlist") supported by the target integrated circuit device. The circuit design 104 is mapped onto primitive components within the target device (e.g., programmable logic blocks of an FPGA).

Following mapping, placement of the components of the mapped circuit design 104 is then performed for the target device. During placement, each mapped component of the circuit design 104 is assigned to a physical position on the chip. The purpose of the placer is to place connected design objects in close physical proximity to one another. This conserves space on the chip and increases the probability that the desired interconnections between components will be successfully completed by the router. Placing connected components close to one another also generally improves the performance of the circuit because long interconnect paths are associated with excess capacitance and resistance and longer delays.

Specified connections between components of the circuit design 104 are routed within the target device for the placed components. Routing specifies physical wiring resources that will be used to conduct signals between pins of placed components of the circuit design 104. For each connection specified in the circuit design 104, routing must allocate wiring necessary to complete the connection. As used herein, the selection and assignment of wire resources in connecting the output pin of one component to the input pin of another component is referred to as routing a signal. When signals have been routed using most or all of the wiring resources in a given area, the area is generally referred to as congested, which creates competition for the remaining wiring resources in the area or makes routing of additional signals in the area impossible.

Placement and routing procedures sometimes involve optimizations of a design's timing, power consumption, routing resources utilized, and any combination thereof. In some instances, timing-based estimations of the circuit design 104 are also provided.

The circuit design process generally includes functional and timing simulations to verify correct operation prior to manufacturing. A circuit design 104 may be modified several times to correct errors identified during testing. Whenever a modification is made, the design placement and routing procedures must be repeated. Due to the large amount of time required for placement and routing of an entire circuit design 104, it is desirable to avoid repeating the entire place-and-route process when only a small portion of the circuit design 104 has changed.

BRIEF SUMMARY

Disclosed herein is a technique to more efficiently utilize FPGA place and route tools and resources when connecting two or more independently created blocks, such as when connecting one or more such blocks to other such blocks. One such block may be an Intellectual Property (IP) block, which as is well known, refers to a block representing a circuit design supplied by a third party vendor. The improved technique enables the specification of the symmetrical equivalence of certain interconnect signals. Symmetrically equivalent signals are permutable, a property that place and route tools may utilize to minimize routing bottlenecks. Conventionally, interconnect information is done via explicit connections, wherein a lack of a means to specify the symmetrical equivalence often result in over-constrained designs that trigger routing bottlenecks that cause routing failures or long routing times. The new technique facilitates overall routability by allowing the place-and-route tools to swap any permutable interconnect.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Disclosed herein are embodiments of a system and process for improved utilization of FPGA placement and routing logic (e.g., Xilinx's Vivado) to connect, for example, one Intellectual Property (IP) block to one or more other, for example, IP blocks. To facilitate the description, herein the technique is described as applied to the first level of IP block multiplexer inputs, which may be defined, in accordance with one example, to be symmetrically equivalent (e.g., FIG. 6). The technique is generally applicable to other types of circuits or block, IP or otherwise, with similar characteristics, such as multiplexing sockets and address decoders.

In one embodiment, the circuit design under test (DUT) and IP block may be input to placement and routing logic, without super logic region (SLR) partitioning, if applicable. An SLR is understood to refer to a multi-die device. The DUT and IP block inputs are each specified in digital files. One file may include a top level module comprising the instantiation of the two blocks being connected to one another (DUT and IP block). A second file may include the DUT netlist and the time-division-multiplexing (TDM) sockets with no SLR-level partitioning. A third file may include the contents of the IP block, either as a netlist or a precompiled macro. Another file may designate groups of permutable signals. Permutable signals are understood to refer to signals that are considered interchangeable for purposes of placement and routing. Another file may optionally include place-and-route constraints and directives (e.g., to create SLRs).

In one embodiment, logic is applied to generate the DUT netlist in the form of an EDIF file, e.g., 'design.edf' from two input netlist (EDIF) files, 'FPGA.edf' and 'wrapper.edf'. The DUT comprises the circuit design as well as the pins of signals intended as input to the IP block. The DUT includes a parameterizable port vector (e.g., of up-to 512K signal ports), herein referred to as 'zpc_data', which represents the interface between the DUT and the IP block.

Figure 2A:
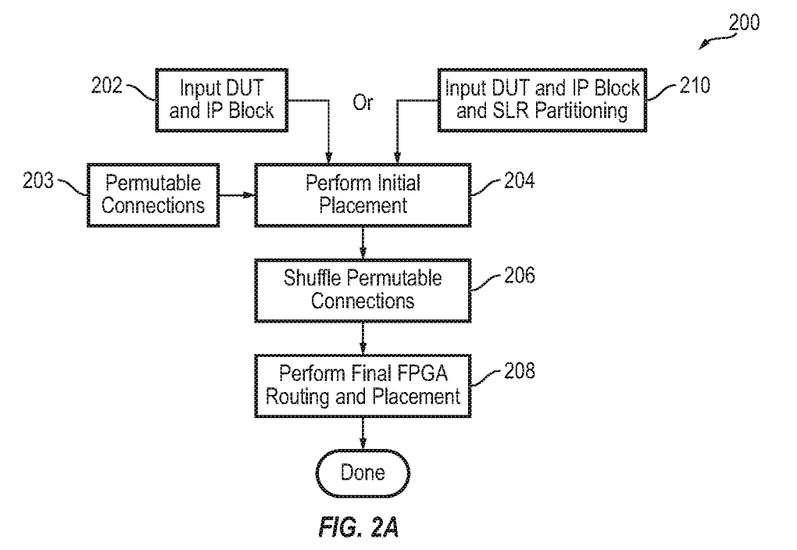
FIGS. 2A and 2B illustrate different placement and routing processes in accordance with different embodiments of the present invention.

Referring to FIG. 2A, a placement and routing process 200 is shown as receiving an input DUT and an IP block (block 202). Alternatively, the placement and routing process 200 receives the input DUT, the IP block, and an SLR partitioning (block 210). In addition, the placement and routing process receives the permutable connections specification 203, which in accordance with embodiment of the present invention is defined by a user. In other words, in accordance with embodiments of the present invention, a user is enabled to define any number of signals that provide communication between the DUT and IP blocks as permutable. Furthermore, the user may define a number of different groups each having permutable signals. For example, the user may define, e.g., three groups, namely groups A, B and C, each with permutable signals. Accordingly, the signals in group A form a first set of permutable signals; the signals in group B form a second set of permutable signals different from the first set of permutable signals; and the signals in group C form a third set of permutable signals different from the first and second sets of permutable signals. Initial placement of components is performed (block 204). The permutable connections are optionally shuffled (block 206). The final FPGA routing and placement is performed (block 208).

Figure 2B:
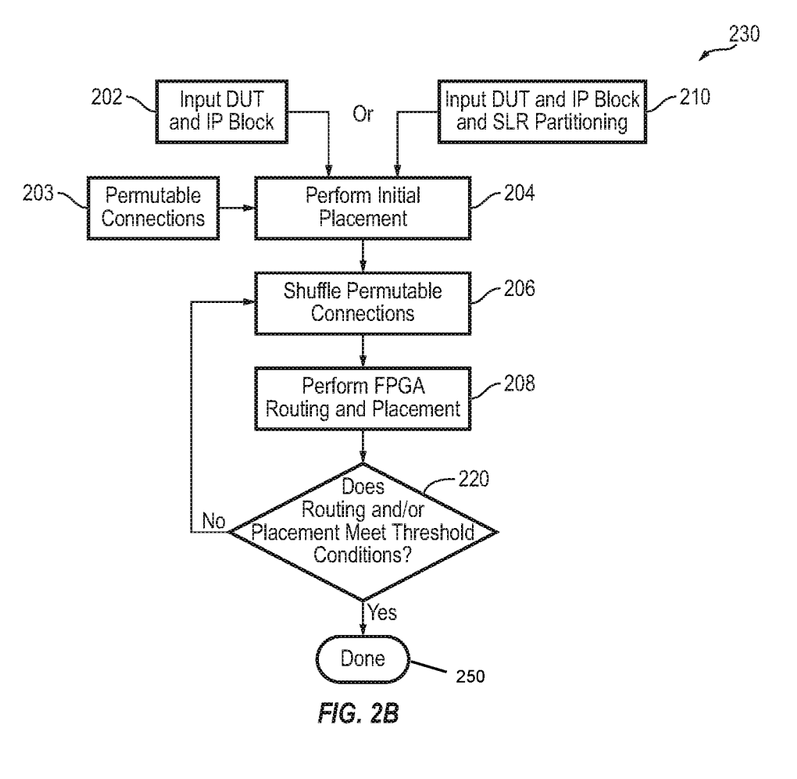

FIG. 2B is a flowchart 230 of a placement and routing process, in accordance with another embodiment of the present invention. Flowchart 230 is similar to flowchart 200 except that in flowchart 230 after performing a routing and placement at 208, a determination is made at 220 as to whether the routings and/or placements satisfy a predefined condition (e.g., wire length requirements). If the condition is satisfied at 220, the routing and placement is considered final and the process ends at 250. If the condition is not satisfied at 220, the process returns to 206 to arrive at a different set of placement and routing defined by the permutable connections. Although not shown, it is understood that in other embodiments, the specification of permutable connections and their shuffling may be performed at other steps in the flowchart.

Figure 3:
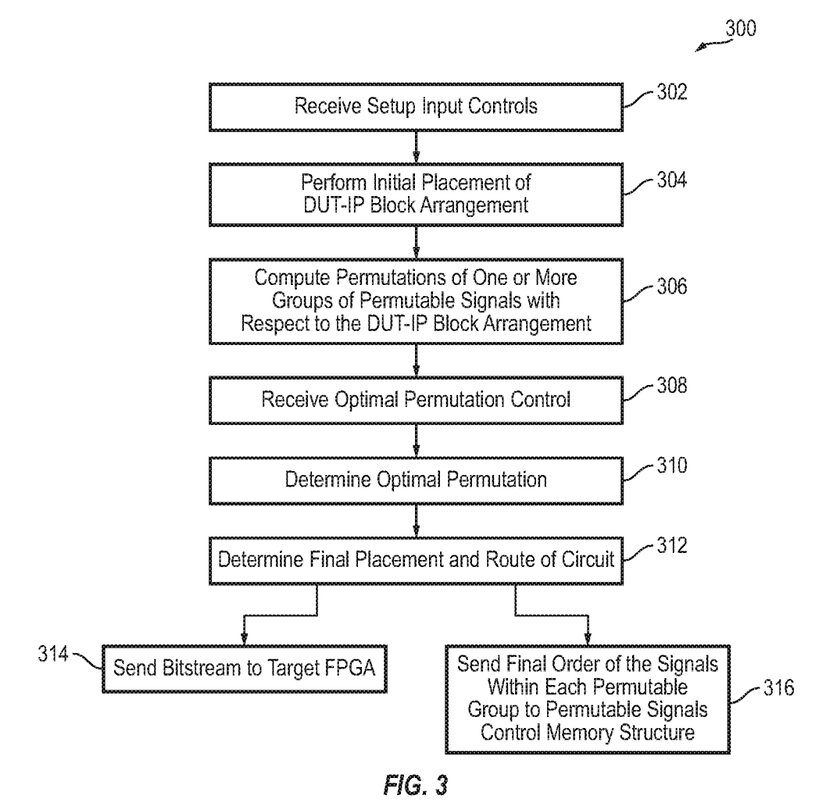
FIG. 3 illustrates an embodiment of a connection optimization process.

Referring to FIG. 3, a connection optimization process 300 may receive setup input controls (block 302). Initial placement of a design block-IP block arrangement is then performed (block 304). Permutations of one or more groups of permutable signals are performed on the-the design block-IP block arrangement (block 306). An optimal permutation control is received from an optimal permutation control memory structure, which comprises instructions as to which permutation is optimal (block 308). The optimal permutation is determined at 310 using a figure of merit. For example, in one embodiment, reducing the wire lengths may be used as a figure of merit in achieving an optimal permutation. In yet another embodiment, reducing routing constraints may be used as a figure of merit in achieving an optimal permutation. The final placement and route of a circuit is performed based on the optimal permutation and compiled into a bitstream (block 312). The bitstream can later be sent to a target FPGA (block 314). The final order of the signals within each permutable group is then recorded in a permutable signals control memory structure (block 316) or some other storage media. An implementation may iterate over processes 306 through 312 to achieve an optimal placement and route of the circuit.

Figure 4:
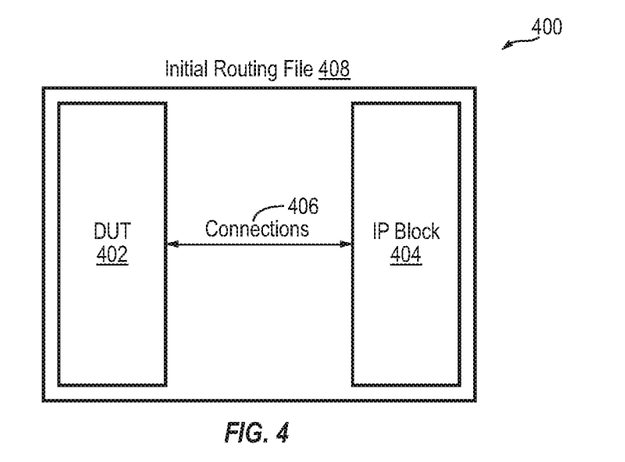
FIG. 4 illustrates an arrangement of two interconnected blocks, namely a design block (DUT) and an IP block, in accordance with one embodiment.

Referring to FIG. 4, two endpoints of each member of the 'zpc_data' vector (e.g., connections 406) between the DUT 402 and the IP block 404, herein 'we_ip_top') are pre-connected, e.g., as defined in an initial routing file 408, herein 'fx_op.dcp'. The DUT 402 and the IP block 404 are formed from the contents of the DUT netlist (e.g., 'design.edf') and IP block definition file (e.g., 'ip_cluster.dcp'), respectively.

Figure 5:
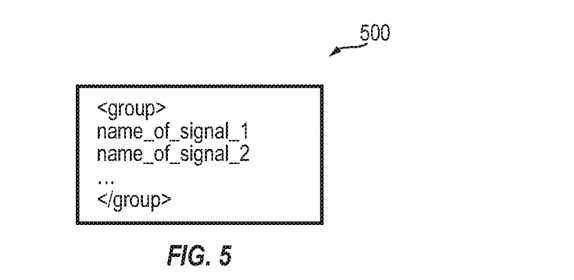
FIG. 5 illustrates a control structure to designate groups of permutable signals in accordance with one embodiment.

The connections 406 may comprise one or more groups of symmetrically equivalent (permutable) signals defined in a digital file, e.g., 'rewire_grp.txt'. Each group contains a set of signals corresponding to permutable pins. The order of the pins within a group may be permuted by the placement and routing logic. The structure of each group in one embodiment is as shown in FIG. 5.

In another embodiment, the DUT and IP block may be input to placement and routing logic, with SLR partitioning. Digital file inputs to this embodiment of the process include a file with the top-level 'fx_top' module comprising the instantiation of the two blocks being connected to one another (DUT and IP block), and the connections between the two instances; a file corresponding to the DUT netlist; a DCP file (a binary database that includes netlist information) corresponding to the IP block circuit-a precompiled macro; a file comprising route-and-pace constraints such as pblock commands to designate SLRs for either or both the DUT and the IP block.

In this embodiment, the DUT and the IP block are partitioned into SLRs (e.g., four regions) corresponding to the die slices in the FPGA. The 'design.xdc' file comprises design constraints for the placement and routing logic. This file comprises pblock placement constraints to divide the circuitry of the DUT and IP block into the FPGA die partitions (SLRs).

Placement and Routing Process

The placement and routing logic produces (i) a bitstream file for download onto the target FPGA, and (ii) an updated version of the file comprising groups of permutable signals (e.g., 'rewire_grp.txt'), specifying a final ordering of the signals within each permutable group.

The connections 406 (e.g., of 'zpc_data' vector) between the DUT 402 and the IP block 404 (i.e., 1024-to-1 wide multiplexers) are permutable. This relaxed constraint allows the placement and routing logic to explore better placement to facilitate FPGA routability.

The placement and routing logic places the components of the DUT 402 and the IP block 404, calculates the optimal placement for the drivers of the connections 406 (e.g., 'zpc_data' wires), and routes the entire circuit. After this process, the placement and routing logic creates the corresponding bitstream file, and a file 'rewire_grp.out' that indicates the final signal order.

Figure 6:
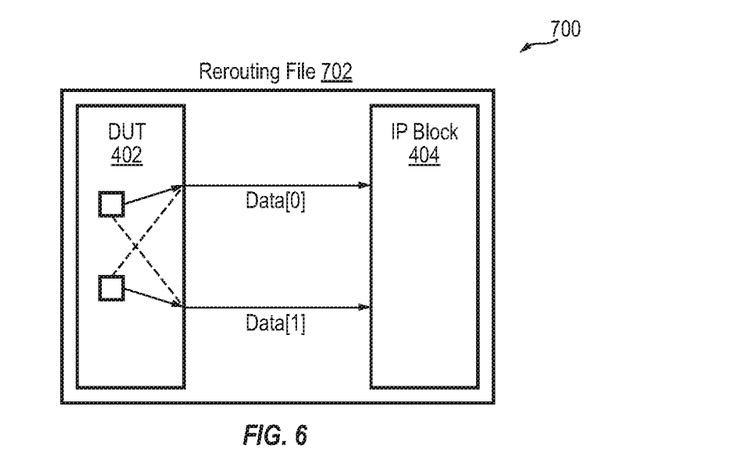
FIG. 6 illustrates a set of permuted interconnections between a block (DUT)-and an IP block arrangement in accordance with one embodiment.

Referring to FIG. 6, the solid lines between the driver circuits (e.g., flip-flops) in the DUT 402 and the zpc_data[*] wires (e.g., data[0], data[1]) represent the initial connections. The dotted lines represent the new connections with shorter wire-lengths. In other words, because the solid lines are defined by a user as permutable signals, they are interchanged by the router to achieve shorter wire lengths.

After the placement and routing process concludes, the 'rewire_grp.out' file (permuted connections) may be loaded by the simulator at run-time to reflect the new connectivity, i.e., update the information reflecting the order of the ensuing data stream.

Placement and Routing System

Figure 7:
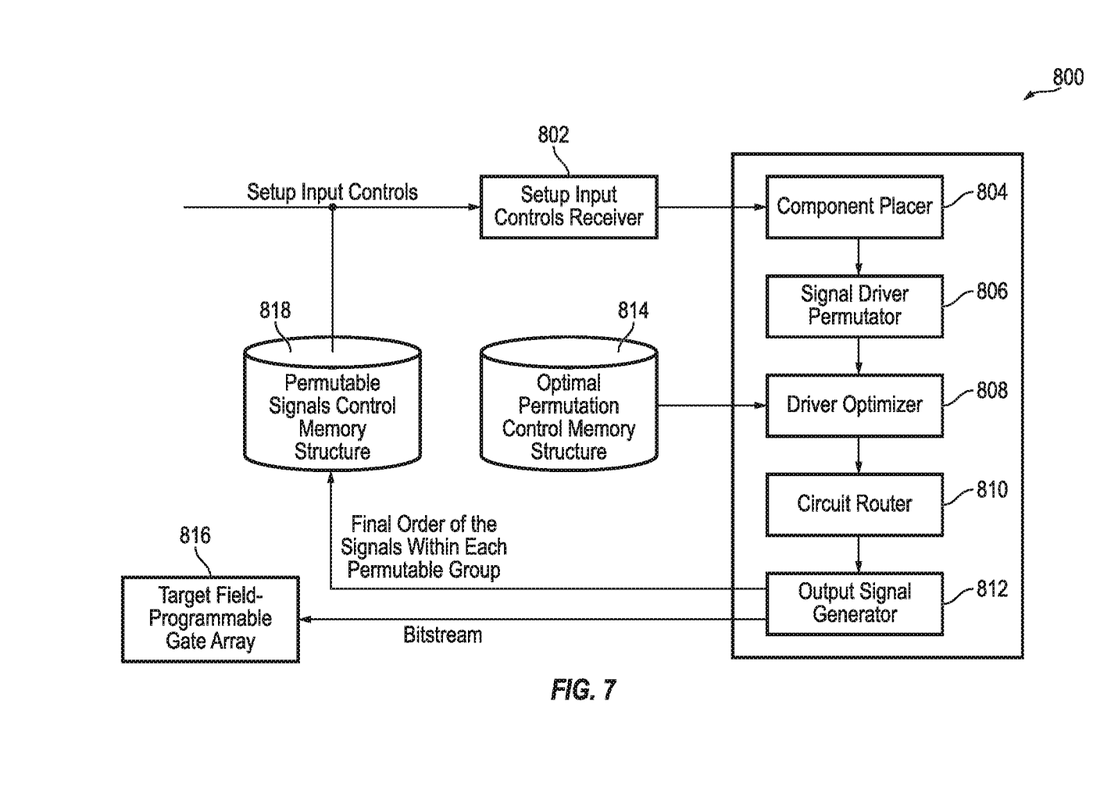
FIG. 7 illustrates an embodiment of a connection optimization system.

Referring to FIG. 7, a connection optimization system 800 may comprise a setup input controls receiver 802, a component placer 804, a signal driver permutator 806, a driver optimizer 808, a circuit router 810, an output signal generator 812, an optimal permutation control memory structure 814, a target FPGA 816, and a permutable signals control memory structure 818.

The setup input controls receiver 802 may receive setup input controls and send the setup input controls to the component placer 804. The setup input controls may comprise information including a DUT, an IP block, DUT-IP block connections; and the specification of one or more groups of permutable signals.

The component placer 804 generates, e.g., a DUT-IP block arrangement from the setup input controls. The signal driver permutator 806 generates a set of design block-IP block permutations from the-DUT-IP block arrangement and the one or more groups of permutable signals. The driver optimizer 808 receives an optimal permutation control from an optimal permutation control memory structure 814. The driver optimizer 808 utilizes the optimal permutation control to select the optimal permutation from the set of design block-IP block permutations.

The circuit router 810 determines a circuit route based on the optimal permutation and encodes the circuit routes into a bitstream. The output signal generator 812 records the bitstream to be loaded onto the target FPGA 816 and sends the final order of the signals within each permutable group to a permutable signals control memory structure 818.

The connection optimization system 800 may be operated in accordance with the processes of FIG. 2 and FIG. 3. Although the above description of FIG. 7 is provided with reference to an IP block, it is understood that the embodiments of the present invention are not so limited, as the above embodiment of the present invention apply to any blocks, IP or otherwise.

Figure 8:
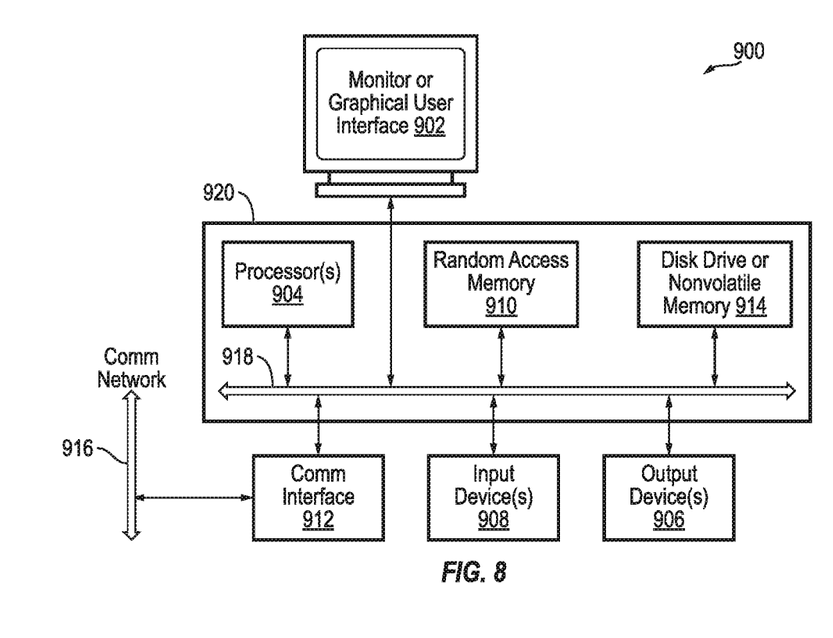
FIG. 8 is an example block diagram of a computer system that may incorporate embodiments of the present invention.

FIG. 8 is an example block diagram of a computer system 900 that may incorporate embodiments of the present invention. FIG. 8 is merely illustrative of a machine system to carry out aspects of the technical processes described herein, and does not limit the scope of the claims. One of ordinary skill in the art would recognize other variations, modifications, and alternatives. In one embodiment, the computer system 900 typically includes a monitor or graphical user interface 902, a computer 920, a communication network interface 912, input device(s) 908, output device(s) 906, and the like.

As depicted in FIG. 8, the computer 920 may include one or more processor(s) 904 that communicate with a number of peripheral devices via a bus subsystem 918. These peripheral devices may include input device(s) 908, output device(s) 906, communication network interface 912, and a storage subsystem, such as a random access memory 910 and a disk drive or nonvolatile memory 914.

The input device(s) 908 include devices and mechanisms for inputting information to the computer 920. These may include a keyboard, a keypad, a touch screen incorporated into the monitor or graphical user interface 902, audio input devices such as voice recognition systems, microphones, and other types of input devices. In various embodiments, the input device(s) 908 are typically embodied as a computer mouse, a trackball, a track pad, a joystick, wireless remote, drawing tablet, voice command system, eye tracking system, and the like. The input device(s) 908 typically allow a user to select objects, icons, text and the like that appear on the monitor or graphical user interface 902 via a command such as a click of a button or the like.

The output device(s) 906 include all possible types of devices and mechanisms for outputting information from the computer 920. These may include a display (e.g., monitor or graphical user interface 902), non-visual displays such as audio output devices, etc.

The communication network interface 912 provides an interface to communication networks (e.g., communication network 916) and devices external to the computer 920. The communication network interface 912 may serve as an interface for receiving data from and transmitting data to other systems. Embodiments of the communication network interface 912 typically include an Ethernet card, a modem (telephone, satellite, cable, ISDN), (asynchronous) digital subscriber line (DSL) unit, FireWire interface, USB interface, and the like. For example, the communication network interface 912 may be coupled to the communication network 916 via a FireWire bus, or the like. In other embodiments, the communication network interface 912 may be physically integrated on the motherboard of the computer 920, and may be a software program, such as soft DSL, or the like.

In various embodiments, the computer system 900 may also include software that enables communications over a network such as the HTTP, TCP/IP, RTP/RTSP protocols, and the like. In alternative embodiments, other communications software and transfer protocols may also be used, for example IPX, UDP or the like. In some embodiments, the computer 920 in the processor(s) 904 may include one or more microprocessors from Intel®. Further, one embodiment, the computer 920 includes a UNIX-based operating system.

The random access memory 910 and the disk drive or nonvolatile memory 914 are examples of tangible media configured to store data and instructions to implement various embodiments of the processes described herein, including executable computer code, human readable code, or the like. Other types of tangible media include floppy disks, removable hard disks, optical storage media such as CD-ROMS, DVDs and bar codes, semiconductor memories such as flash memories, non-transitory read-only-memories (ROMS), battery-backed volatile memories, networked storage devices, and the like. The random access memory 910 and the disk drive or nonvolatile memory 914 may be configured to store the basic programming and data constructs that provide the functionality of the disclosed processes and other embodiments thereof that fall within the scope of the present invention.

Software code modules and instructions that implement embodiments of the present invention may be stored in the random access memory 910 and/or the disk drive or nonvolatile memory 914. These software modules may be executed by the processor(s) 904. The random access memory 910 and the disk drive or nonvolatile memory 914 may also provide a repository for storing data used by the software modules.

The random access memory 910 and the disk drive or nonvolatile memory 914 may include a number of memories including a main random access memory (RAM) for storage of instructions and data during program execution and a read only memory (ROM) in which fixed non-transitory instructions are stored. The random access memory 910 and the disk drive or nonvolatile memory 914 may include a file storage subsystem providing persistent (non-volatile) storage for program and data files. The random access memory 910 and the disk drive or nonvolatile memory 914 may include removable storage systems, such as removable flash memory.

The bus subsystem 918 provides a mechanism for letting the various components and subsystems of computer 920 communicate with each other as intended. Although the communication network interface 912 is depicted schematically as a single bus, alternative embodiments of the bus subsystem 918 may utilize multiple busses.

FIG. 8 is representative of a computer system capable of implementing embodiments of the present invention. It will be readily apparent to one of ordinary skill in the art that many other hardware and software configurations are suitable for use with embodiments of the present invention. For example, the computer may be a desktop, portable, rack-mounted or tablet configuration. Additionally, the computer may be a series of networked computers. Further, the use of other microprocessors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

Various embodiments of the present invention may be implemented in the form of logic in software or hardware or a combination of both. The logic may be stored in a computer readable or machine-readable non-transitory storage medium as a set of instructions adapted to direct a processor of a computer system to perform a set of steps disclosed in embodiments of the present invention. The logic may form part of a computer program product adapted to direct an information-processing device to perform a set of steps disclosed in embodiments of the present invention. Based on the disclosure and teachings provided herein, a person of ordinary skill in the art will appreciate other ways and/or methods to implement the present invention.

The data structures and code described herein may be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described herein include, but are not limited to, application-specific integrated circuits (ASICs), field-programmable gate arrays (FPGAs), dedicated or shared processors, and/or other hardware modules or apparatuses now known or later developed. Collectively, all of these physical embodiments of code and data structures may be referred to herein as "logic".

The methods and processes described herein may be partially or fully embodied as code and/or data stored in a computer-readable storage medium or device, so that when a computer system reads and executes the code and/or data, the computer system performs the associated methods and processes. The methods and processes may also be partially or fully embodied in hardware modules or apparatuses, so that when the hardware modules or apparatuses are activated, they perform the associated methods and processes.

The methods and processes disclosed herein may be embodied using a combination of code, data, and hardware modules or apparatuses.

The above descriptions of embodiments of the present invention are illustrative and not limitative. In addition, similar principles as described corresponding to latches and/or flops can be applied to other sequential logic circuit elements. Other modifications and variations will be apparent to those skilled in the art and are intended to fall within the scope of the appended claims.

What is claimed:

1. A method of routing signals between first components and second components in a programmable device, the method comprising:
   generating an initial routing of connections between the first components and the second components in a programmable device;
   receiving a plurality of groups each having permutable signals within the initial routing of connections providing communication between the first components and the second components, wherein each of a first group and a second group of permutable signals are defined in one or more digital files and the each of the first group and the second group of permutable signals contains a set of signals corresponding to permutable pins;
   selecting a first optimal permutation using a first figure of merit for the first group;
   selecting a second optimal permutation using a second figure of merit for the second group;
   determining a first order of the permutable pins of the first group based on performing the first optimal permutation on the first group;
   determining a second order of the permutable pins of the second group based on performing the second optimal permutation on the second group; and
   rerouting signals between the first components and the second components in accordance with one of the first group and the second group of permutable signals based on one of the first order and the second order respectively.

2. The method of claim 1 wherein the first figure of merit is based on minimizing lengths of associated wires within the first group.

3. The method of claim 1, wherein the first figure of merit is based on minimizing routing resources within the first group.

4. An apparatus for routing signals between first components and second components in a programmable device, the apparatus comprising at least one processor, and at least one memory having computer coded instructions therein, with the computer coded instructions configured to, when executed by the processor, cause the apparatus to:
   generate an initial routing of connections between the first components and the second components in a programmable device;
   receive a plurality of groups each having permutable signals within the initial routing of connections providing communication between the first components and the second components, wherein each of a first group and a second group of permutable signals are defined in one or more digital files and the each of the first group and the second group of permutable signals contains a set of signals corresponding to permutable pins;
   select a first optimal permutation using a first figure of merit for the first group;
   select a second optimal permutation using a second figure of merit for the second group;
   determine a first order of the permutable pins of the first group based on performing the first optimal permutation on the first group;
   determine a second order of the permutable pins of the second group based on performing the second optimal permutation on the second group; and
   reroute signals between the first components and the second components in accordance with one of the first group and the second group of permutable signals based on one of the first order and the second order respectively.

5. The apparatus of claim 4, wherein the first figure of merit is based on minimizing lengths of associated wires with the first group.

6. The apparatus of claim 4, wherein the first figure of merit is based on minimizing routing resources within the first group.

7. A computer program product for routing signals between first components and second components in a programmable device, the computer program product comprising a non-transitory computer readable storage medium and computer program instructions stored therein, the computer program instructions comprising program instructions configured to:
   generate an initial routing of connections between the first components and the second components in a programmable device;
   receive a plurality of groups each having permutable signals within the initial routing of connections providing communication between the first components and the second components, wherein each of a first group and a second group of permutable signals are defined in one or more digital files and the each of the first group and the second group of permutable signals contains a set of signals corresponding to permutable pins;
   select a first optimal permutation using a first figure of merit for the first group;
   select a second optimal permutation using a second figure of merit for the second group;
   determine a first order of the permutable pins of the first group based on performing the first optimal permutation on the first group;
   determine a second order of the permutable pins of the second group based on performing the second optimal permutation on the second group; and
   reroute signals between the first components and the second components in accordance with one of the first group and the second group of permutable signals based on one of the first order and the second order respectively.

8. The computer program product of claim 7, wherein the first figure of merit is based on minimizing lengths of associated wires with the first group.

9. The computer program product of claim 7, wherein the first figure of merit is based on minimizing routing resources within the first group.

* * * * *